A. MacLEAN.
LAMP CORD REEL.
APPLICATION FILED JUNE 23, 1911.
1,139,554.
Patented May 18, 1915.
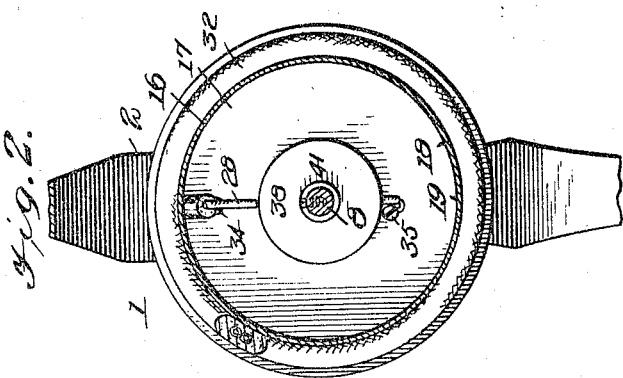
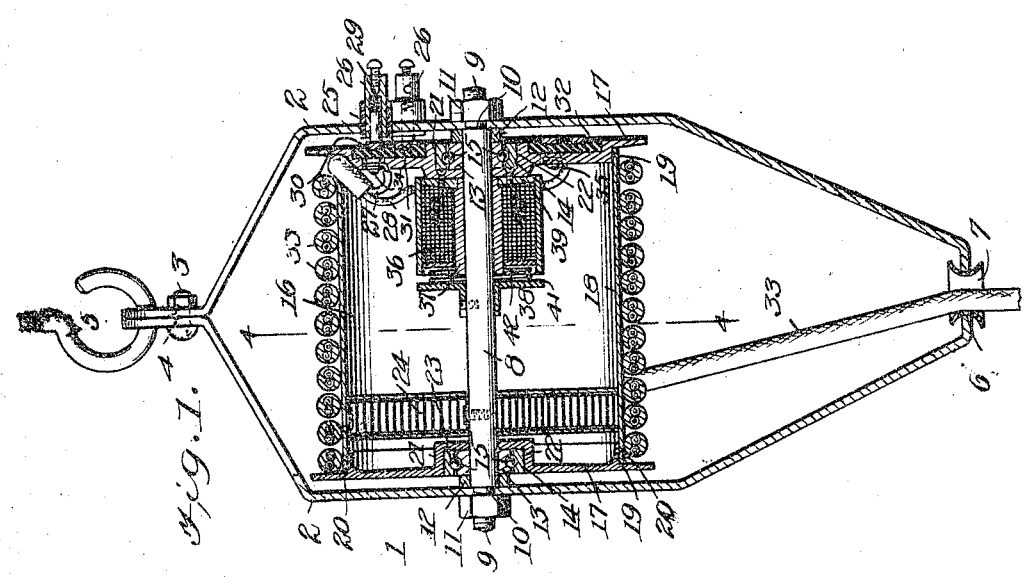
Witnesses
Inventor
Archibald MacLean
By Victor J. Evans
Attorney

UNITED STATES PATENT OFFICE.

ARCHIBALD MacLEAN, OF NEW YORK, N. Y.

LAMP-CORD REEL.

1,139,554.      Specification of Letters Patent.      Patented May 18, 1915.

Application filed June 23, 1911. Serial No. 634,904.

*To all whom it may concern:*

Be it known that I, ARCHIBALD MacLEAN, a citizen of Canada, residing at New York, in the county of New York and State of New York, have invented new and useful Improvements in Lamp-Cord Reels, of which the following is a specification.

This invention relates to lamp cord reels and the object of the invention is the provision of a device of this character whereby a lamp, such as an incandescent lamp, may be conveniently moved around and adjusted while lighted but which cannot be wound up while the lamp is burning, therefore to return the lamp to normal position it must be put out, and to put the lamp out releases the holding means and thus permits the lamp to be returned to normal.

A further object of the invention is the provision of a spring operated reel adapted to normally wind the cord of the lamp thereon and a magnetic clutch controlled by the current passing through the cord to prevent the winding operation of the reel except when the current is turned off from the lamp, at which time the spring will operate to turn the reel and wind up the cord.

Further objects of the invention will appear as the following specific description is read in connection with the accompanying drawings, which form a part of this application, and in which:—

Figure 1 is a vertical sectional elevation of the device. Fig. 2 is a vertical section on line 4—4 of Fig. 1.

Referring more particularly to the drawing, 1 represents a frame which consists of the side members 2 having their upper ends bent together and connected by a bolt 3. Immediately above the connection the ends are provided with an aperture 4 which is adapted to receive a supporting hook 5 or supporting device by which the frame and reel are supported. The lower ends of the members are connected together and are supplied with an aperture 6 in which a guide 7 is secured, preferably formed of insulating material. Extending across the side members, intermdeiate their length, is a shaft 8 having reduced and threaded ends 9 which form shoulders 10 adapted to abut against the inner side of the side pieces and to form an abutment which is drawn against the frame to clamp the shaft from rotation by means of the nuts 11 which are threaded upon the ends 9. Surrounding the shaft and lying against the inner side of the side members are spacing rings or washers 12 and keyed to the shaft, adjacent the spacing rings 12 are ball race members 13 having ball races 14 formed therein to receive the anti-friction balls 15.

Loosely mounted upon the hub is a reel or drum 16 consisting of the end members 17 and the circular tube 18 which rests upon the annular shoulders 19 formed upon the end members and is secured thereto by the screws 20. The end members 17 are provided with inwardly extending cup members 21 which form recesses adapted to receive the ball cups 22 which have ball races 23 therein to receive one-half of the anti-friction balls 15. Secured to the shaft and to the drum at its opposite ends is a spiral spring 24 which is placed under tension when the cord is drawn off of the drum, as will hereinafter be described.

Mounted in the frame and insulated therefrom by the sleeves 25 are suitable terminal posts 26 to which the separate wires 27 and 28 of the main are connected. These posts are provided with recesses and seated within the recesses are spring pressed carbon brushes 29 which are forced into engagement with the collector rings 30 and 31 carried upon an insulated ring 32 and connected to the conductor cable or cord 33 by binding posts 34 and 35, thus connecting the wire 27 to the binding post 34 and the wire 28 to the binding post 35.

The wire 28 includes the coil 36 on an iron clad electromagnet whose core 37 and casing 38 surround the shaft 9 and are secured thereto by means of a head 39 connected to the cup member 21, by screws 40. Keyed to the shaft 9 so as to rotate therewith is a clutch disk or armature 41 which is normally held away from the core and casing by means of a non-magnetic spring 42 which is overcome when the magnet is energized.

In the operation of the device the lamp cord or cable is pulled out through the insulated guide 7, thus unwinding the reel. When adjusted to the required degree the lamp is lighted and the current passing through the coil 36 of the magnet energizes the same and attracts the clutch disk or armature 41, thus locking the reel or drum to the shaft. The lamp may be lighted before unreeling the cord if found to be necessary and the same unwound against the friction of the contacting surfaces of the core, shell and armature. The spring is not of sufficient strength, however, to wind up the reel until the magnet has beeen deënergized, at which time the spring 42 will disengage the clutch from the magnet when the latter will be free to revolve with the drum under the influence of the spring 24. If necessary small non-magnetic studs 36' may be fixed in either the core, shell or armature so as to prevent actual contact of these parts and thereby permit immediate release of the same when the magnet is deënergized. It is believed best, in practice, to employ this means of release because otherwise the core and shell will hold the armature even after the magnet has been deënergized, both holding sufficient permanent magnetism to prevent immediate release without these precautions.

Having thus described the invention, what I claim as new is:—

In a lamp cord reel, a stationary shaft, a drum loose on said shaft, an electromagnetic clutch within said drum and comprising an electro-magnet disposed concentrically of the shaft, a fixed connection between one end of said magnet and the side wall of said drum, a shell surrounding said magnet and projecting outwardly beyond the pole face thereof, an armature disk splined on said shaft for sliding movement and disposed within the influence of the pole of said magnet and adapted to engage the adjacent edge of the extended end of said shell, whereby a recess is formed between the pole of the magnet and the adjacent face of said disk, and a coiled expansion spring within the space so formed and acting to force the disk away from the magnet upon the deenergization of the latter.

In testimony whereof I affix my signature in presence of two witnesses.

ARCHIBALD MacLEAN.

Witnesses:
JAMES MacLEAN,
EMIL HIGGINS.